H. R. ROBBINS,
Assignor, by mesne assignments, to BISSELL MANUFACTURING CO.
Trap for Wash Boiler.
No. 9,513. Reissued Dec. 21, 1880.
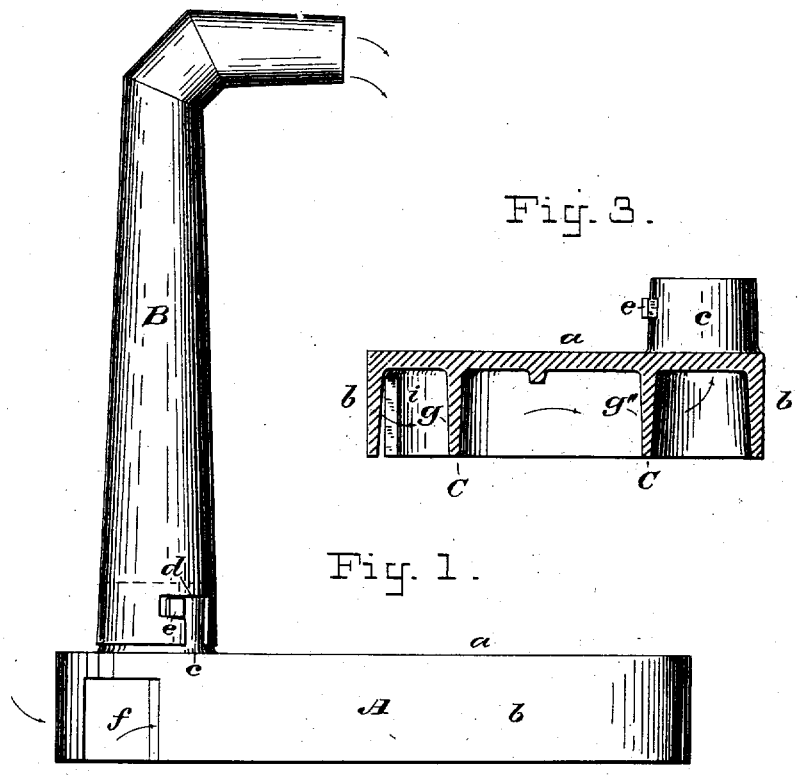
Fig. 1.
Fig. 3.
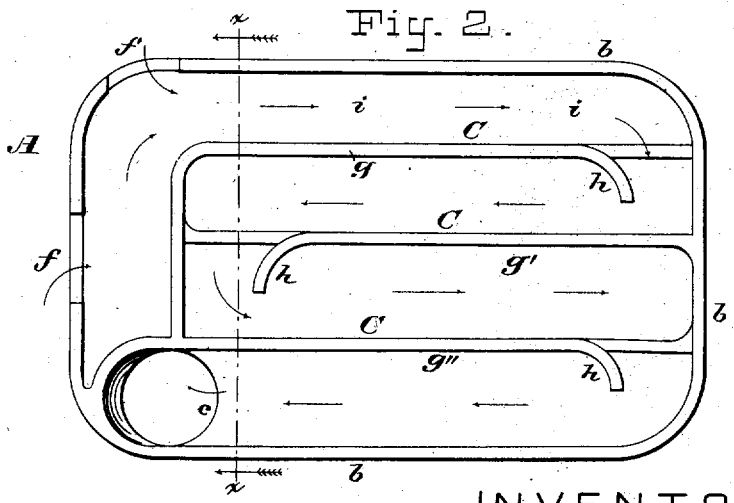
Fig. 2.
ATTEST:
Charles S. King
J. S. Brown
INVENTOR:
Henry R. Robbins,
By his Attorneys,
Burke, Fraser & Connett
N. PETERS, PHOTO-LITHOGRAPHER, WASHINGTON, D. C.

UNITED STATES PATENT OFFICE.

HENRY R. ROBBINS, OF BALTIMORE, MD., ASSIGNOR, BY MESNE ASSIGNMENTS, TO BISSELL MANUFACTURING COMPANY, OF NEW YORK, N. Y.

TRAP FOR WASH-BOILERS.

SPECIFICATION forming part of Reissued Letters Patent No. 9,513, dated December 21, 1880.

Original No. 119,649, dated October 3, 1871. Application for reissue filed September 30, 1880.

*To all whom it may concern:*

Be it known that I, HENRY R. ROBBINS, a citizen of the United States, resident in the city of Baltimore, in the county of Baltimore and State of Maryland, have invented certain Improvements in Fountain-Traps for Wash-Boilers, of which the following is a specification.

The object of my invention is to facilitate the washing of clothes; and it relates to a device intended to be placed on the bottom of a wash-boiler and operating, when the boiler is placed over a fire, to force water and steam upward through a pipe, from which it is ejected with much force and played in a continuous stream upon the clothes within the boiler, causing a current of boiling water to pass downward through the clothes, whereby a great portion of the dirt is removed therefrom.

My invention is designed to overcome the defects of existing devices for this purpose; and it consists of several novel features, all of which will be fully hereinafter set forth.

In the accompanying drawings, Figure 1 is a side elevation of my improved fountain-trap. Fig. 2 is an inverted plan thereof; and Fig. 3 is a vertical transverse section thereof, taken in the plane of the line *x x* in Fig. 2, looking in the direction of the feathered arrow, and having the vertical pipe removed.

A is the trap proper, which is formed with a closed top or roof, *a*, an open bottom, and an outer wall, *b*, whose lower edge is adapted to rest close against the bottom of a wash-boiler.

B is the vertical discharge-pipe, whose upper end I have shown as terminating in an elbow, in order that it may discharge the stream in a horizontal direction, and whose lower end is adapted to fit over a short pipe or neck, *c*, projecting from and forming a part of the trap A. Thus the pipe and trap are made separable; but in order that the pipe may not be accidentally detached while in use, I connect it to the neck *c* by a lantern-joint or bayonet-joint, as shown.

When the trap is placed in a wash-boiler the lower edge of its wall *b* rests upon the bottom thereof, and a substantially close joint is formed between it and the boiler-bottom. The space within the trap is thus made an inclosed steaming-chamber. The boiler being placed over the fire, water enters the trap at *f*, and, circulating within the same and becoming heated and partially converted into steam, passes out in a stream of mingled steam and water through the neck *c*, ascends through the pipe B, and plays upon the clothes in the boiler.

So far as described, there is no essential novelty in my trap.

In order to force the water to follow a circuitous course within the trap, and thereby to obstruct its back-flow, I provide the trap with internal deflecting-partitions projecting downwardly from its roof *a*, and arranged to prevent the direct flow of the water from the inlet to the outlet orifice.

As shown in the drawings, the first partition (lettered *g*) extends from near the neck *c* in a direction substantially parallel with the outer wall, *b*, and terminates in a curve, *h*, whose outer side is toward the outer wall of the trap, and whose inner or concave side is turned toward the neck *c*. The space between the partition *g* and wall *b* forms a channel, *i*, along which the water flows in the direction of the arrows. Should the water attempt to flow in the opposite direction, it would be caught by the concave side of the curve *h*, and its flow thereby impeded; but when passing in the direction of the arrows it flows around the convex side of the curve, which offers no such obstruction to its passage.

*g'* and *g''* are additional partitions, alternately arranged, and each terminating in a curve, *h*, whereby the passage or channel for the flow of the water is of zigzag form, bending alternately to the right and left. It will be observed that where the curves *h* approach the opposite partitions the channel is contracted.

My trap is designed to be placed in any convenient position on the bottom of the boiler, not being made to conform thereto, and consequently not being supported and kept in place by the sides thereof. It is given sufficient weight to counteract the lifting tendency of the confined steam, and to enable it to keep its place within the boiler during the insertion and removal of the clothes.

I claim as my invention—

1. A fountain-trap for wash-boilers, formed with a closed top or roof, an open bottom, a downwardly-projecting outer wall whose lower edge is adapted to rest upon the boiler-bottom, a water-inlet orifice, a water-exit tube, and a downwardly-projecting interior deflecting-partition interposed between the inlet and exit orifices, and acting to prevent the direct flow of the water from one to the other, substantially as set forth.

2. An open-bottomed fountain-trap for wash-boilers, formed with the closed roof *a*, downwardly-projecting outer wall, *b*, water inlet and exit orifices, and downwardly-projecting partition *g*, extending from near the water-inlet parallel to the wall *b*, and terminating in a curve, *h*, arranged substantially as specified, whereby a water-channel, *i*, is formed within the trap.

3. An open-bottomed fountain-trap for wash-boilers, provided with inlet and exit orifices, and having internal partitions arranged to form a zigzag water-passage between said orifices, substantially as set forth.

4. An open-bottomed fountain-trap for wash-boilers, formed with inlet and outlet orifices, and having alternately-arranged downwardly-projecting interior partitions terminating in curves *h h*, and arranged to form a continuous water channel or passage from the inlet to the outlet orifices, substantially as set forth.

In witness whereof I have hereunto signed my name in the presence of two subscribing witnesses.

HENRY R. ROBBINS.

Witnesses:
GEO. A. HEMMICK,
WM. P. TWAMLEY.